United States Patent Office 2,824,111
Patented Feb. 18, 1958

2,824,111
PYRROLIDINES

Richard V. Heinzelman, Kalamazoo Township, Kalamazoo County, Mich., assignor to The Upjohn Company, Kalamazoo, Mich., a corporation of Michigan No Drawing. Application November 12, 1952
Serial No. 320,123

18 Claims. (Cl. 260—326.5)

This invention relates to new compositions of matter which possess therapeutic value. More particularly, the invention relates to N-[β-alkoxyphenyl-(α-alkyl)-ethyl]-pyrrolidines, acid addition and quaternary ammonium salts thereof, and to a method for the preparation of these compounds.

The novel N-[β-alkoxyphenyl-(α-alkyl)-ethyl]-pyrrolidines are represented by the following general formula:

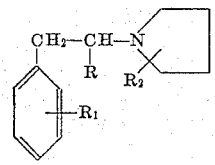

wherein R is a lower-alkyl group, $R_1$ is a lower-alkoxy group, and $R_2$ is a member selected from the group consisting of hydrogen, phenyl and mono- and di- lower-alkyl radicals, said lower-alkyl and said lower-alkoxy radicals containing from one to eight carbon atoms inclusive.

It is an object of the present invention to provide novel N-[β-alkoxyphenyl-(α-alkyl)-ethyl]-pyrrolidines possessing valuable therapeutic properties. Another object of this invention is to provide a process for the preparation of these compounds. Other objects and features of the invention will be apparent to those skilled in the art to which this invention pertains.

The foregoing and additional objects are accomplished by provision of compounds having the formula indicated supra.

These novel compounds are useful for therapeutic purposes, for instance, as bronchodilators. Further, the therapeutic materials of the present invention counteract histamine-induced spasm of smooth muscle tissue and are therefore useful in the treatment of various allergic manifestations such as, for example, hay fever. In marked contrast with the undesirable pressor activity generally produced by bronchodilators, the N-[β-alkoxyphenyl-(α-alkyl)-ethyl]-pyrrolidines of the present invention exert a mild depressor action.

The compounds of the present invention may be prepared by dissolving a pyrrolidine and an alkoxybenzyl-alkyl-ketone in a solvent such as, for example, methanol, ethanol, dioxane, or the like, and subjecting the resulting solution to hydrogenation with hydrogen, preferably at super-atmospheric pressure in the presence of a hydrogenation catalyst such as platinum, platinum oxide, palladium-charcoal, or the like, the temperature during the hydrogenation step being maintained between about twenty and sixty degrees centigrade. The hydrogenation of the mixture containing the pyrrolidine and alkoxybenzyl-alkyl-ketone to the desired N-[β-alkoxyphenyl-(α-alkyl)-ethyl]-pyrrolidine is effected within a period of about one to twelve hours, depending upon reaction conditions such as the temperature and pressure employed. On distillation of the reaction mixture, the solvent is removed and the N-[β-alkoxyphenyl-(α-alkyl)-ethyl]-pyrrolidine is obtained in the form of a colorless oil. To prepare acid addition salts thereof, the N-[β-alkoxyphenyl-(α-alkyl)-ethyl]-pyrrolidine is dissolved in a suitable solvent such as acetone, ether, ethyl acetate, or the like, and an alcoholic solution of a desired acid such as hydrogen chloride, sulfuric acid, or the like, added thereto to obtain the corresponding acid addition salt of the N - [β - alkoxyphenyl - (α - alkyl) - ethyl] - pyrrolidine. The acid addition salts of the N-[β-alkoxyphenyl-(α-alkyl)-ethyl]-pyrrolidines which are prepared in this manner can be purified by recrystallization from suitable mixtures of solvents such as, for example, ethanol and acetone, methanol and ether, isopropanol and ethyl acetate, or the like.

The N - [β - alkoxyphenyl - (α - alkyl) - ethyl] - pyrrolidines of the present invention are generally low-melting solids or oils which are readily soluble in common organic solvents such as ether, ethyl acetate, benzene or the like; soluble in oils such as peanut oil, cottonseed oil, soybean oil, or the like; and insoluble in water.

By reacting a substituted-pyrrolidine such as, for example, 2-methylpyrrolidine, 2,2-dimethylpyrrolidine, 3-ethylpyrrolidine, 2-phenylpyrrolidine, 3-phenylpyrrolidine, or the like, with an alkoxybenzyl-alkyl-ketone, an N - [β - alkoxyphenyl - (α - alkyl) - ethyl] - substituted-pyrrolidine is obtained.

Due to the presence of nitrogen in the molecule, the N - [β - alkoxyphenyl - (α - alkyl) - ethyl] - pyrrolidines react with suitable acids to form acid addition salts. Representative acids which may be used include mineral acids such as hydrogen chloride, hydrogen bromide, sulfuric acid, or the like; aliphatic carboxylic acids such as acetic acid, lactic acid, tartaric acid, succinic acid, or the like; aromatic acids such as benzoic acid, or the like; and strongly acidic phenols such as picric acid, or the like.

Various procedures can be used to prepare the acid addition salts of the N-[β-alkoxyphenyl-(α-alkyl)-ethyl]-pyrrolidines of the present invention. In a preferred methol, an N-[β-alkoxyphenyl-(α-alkyl)-ethyl]-pyrrolidine is dissolved in an organic solvent in which the resulting acid addition salt is insoluble and then mixed in stoichiometric proportions with a selected acid, whereupon the resulting insoluble N-[β-alkoxyphenyl-(α-alkyl)-ethyl]-pyrrolidine acid addition salt usually precipitates from the solution. Another method for the preparation of acid addition salts of N-[β-alkoxyphenyl-(α-alkyl)-ethyl]-pyrrolidines consists in admixing a solution of an N-[β-alkoxyphenyl-(α-alkyl)-ethyl]-pyrrolidine in a solvent such as ethyl acetate or the like, with an alcoholic solution of a selected acid and then evaporating the resulting solution to dryness to obtain the desired acid addition salt of the N-[β-alkoxyphenyl-(α-alkyl)-ethyl]-pyrrolidine. Other methods for preparing acid addition salts of amines may also be used and are known in the art.

Quaternary ammonium salts of the N-[β-alkoxyphenyl-(α-alkyl)-ethyl]-pyrrolidines of the present invention may be prepared in any convenient manner known in the art, as by mixing the free amine base with a selected ester in stoichiometric proportions in the presence of an organic solvent in which the resulting quaternary ammonium salt is insoluble so that precipitation occurs upon formation thereof, or alternatively, by admixing solutions of the selected ester and N-[β-alkoxyphenyl-(α-alkyl)-ethyl]-pyrrolidine and evaporating to dryness to yield the solid quaternary ammonium salt. Representative esters which may be used to form quaternary ammonium salts of N-[β-alkoxyphenyl-(α-alkyl)-ethyl]-pyrrolidines are alkyl halides, aralkyl halides, and alkyl esters of arylsulfonic acids such as, for example, methyl bromide, methyl iodide, cetyl bromide, myristyl iodide, lauryl bromide, benzyl chloride, allyl bromide, ethyl-(para-toluene)-sulfonate, or the like, in which cases the N-[β-alkoxyphenyl-(α-alkyl)-ethyl]-pyrrolidine and the selected salt-forming agent are merely mixed together, heated to complete the reaction, and the resulting quaternary ammonium salt of the N-[β-alkoxyphenyl-(α-alkyl)-ethyl]-pyrrolidine thereafter isolated.

The acid addition and quaternary amonium salts of the N-[β-alkoxyphenyl - (α - alkoxy)-ethyl]-pyrrolidines are usually crystalline compounds possessing well-defined melting points and are generally soluble in water and the lower-aliphatic alcohols and substantially insoluble in solvents such as diethylether, benzene, carbon tetrachloride, or the like.

The following preparations and examples are illustrative of the processes and products of this invention and are not to be construed as limiting.

*Example 1.—N-[β-(para - methoxyphenyl) - α - methylethyl]-pyrrolidine hydrochloride*

Eighty-two grams (0.5 mole) of para-methoxyphenyl-acetone (J. Org. Chem., 12, 502, 1947), and 35.5 grams (0.5 mole) of anhydrous pyrrolidine were dissolved in 75 milliliters of anhydrous ethanol. The resulting solution was placed in a Parr hydrogenation apparatus together with 0.5 gram of Adams platinum oxide catalyst and subjected to hydrogenation at a temperature of about 25 degrees centigrade and a hydrogen pressure of about fifty pounds per square inch until about one mole of hydrogen per mole of starting paramethoxyphenylacetone was taken up, i. e., about four hours. On distillation of the reaction mixture, the solvent was removed and 98.5 grams of N-[β-para-methoxyphenyl)-α-methylethyl]-pyrrolidine in the form of a colorless oil, having a boiling point of 120 degrees centigrade at a pressure of 0.6 millimeter of mercury, was obtained.

The thus-obtained N - [β - (para-methoxyphenyl)-α-methylethyl]-pyrrolidine was dissolved in 200 milliliters of acetone, and sixty cubic centimeters of absolute ethanol containing an equivalent amount of hydrogen chloride was added thereto with stirring. The mixture was chilled. After approximately half of the volume of the alcoholic-acid solution had been added, crystallization of the desired N-[β-(para-methoxyphenyl)-α-methylethyl]-pyrrolidine hydrochloride was induced by scratching the sides of the vessel with a glass rod. Soon thereafter, colorless crystals of N-[β-(para-methoxyphenyl)-α-methylethyl]-pyrrolidine hydrochloride began to form. The crystalline material was isolated by filtration, washed with ether and dried. On the addition of more ether to the filtrate with chilling, further amounts of crystalline N-[β-(para-methoxyphenyl)-α-methylethyl]-pyrrolidine hydrochloride were obtained.

The crystalline N-[β-para-methoxyphenyl)-α- methylethyl]-pyrrolidine hydrochloride thus-obtained was recrystallized by dissolving in a mixture of 1.5 parts of isopropanol, 2 parts of acetone and 10 parts of anhydrous ether. After chilling the resulting mixture, the crystalline material thus formed was filtered and dried to obtain substantially pure N-[β-(para-methoxyphenyl)-α-methylethyl]-pyrrolidine hydrochloride melting at 144 to 145 degrees centigrade.

*Analysis.*—Percent calculated for $C_{14}H_{22}ClNO$: C, 65.73; H, 8.67; N, 5.48. Found: C, 65.80; H, 8.47; N, 5.50.

By heating a solution of N-[β-(para-methoxyphenyl)-α-methylethyl]-pyrrolidine with methyl iodide in benzene and cooling and concentrating the solution, the corresponding N - [β - para - methoxyphenyl)-α-methylethyl]-pyrrolidine methiodide is obtained.

Similarly, by reacting N-[β-(para-methoxyphenyl)-α-methylethyl]-pyrrolidine with selected esters such as, for example, methyl chloride, ethyl bromide, benzyl chloride, and the like, the corresponding quaternary ammonium salts of N-[β-(para - methoxyphenyl)-α-methylethyl]-pyrrolidine are obtained such as, for example, N- β-(para methoxyphenyl)-α-methylethyl] - pyrrolidine methochloride, N-[β-(para - methoxyphenyl) - α - methylethyl]-pyrrolidine ethobromide, N-[β-(para-methoxyphenyl)-α-methylethyl]-pyrrolidine benzyl chloride, and the like.

*Example 2. — N-[β-(ortho - methoxyphenyl)-α-methylethyl]-pyrrolidine hydrochloride*

Using the procedure described supra in Example 1 except for the substitution of para-methoxyphenylacetone by ortho-methoxyphenylacetone (United States Patent No. 2,557,051), N-[β-(ortho-methoxyphenyl)-α-methylethyl]-pyrrolidine boiling at 118 degrees centigrade at a pressure of 0.5 millimeter of mercury and having a refractive index, $n_D^{20}=1.5290$, is obtained. By treating N-[β-(ortho-methoxyphenyl) - α - methylethyl]-pyrrolidine with an alcoholic solution of hydrogen chloride in the manner described supra in Example 1, N-[β-(ortho-methoxyphenyl)-α-methylethyl] - pyrrolidine hydrochloride is formed. On purification and crystallization of the thus-formed acid addition salt, N-[β-(ortho-methoxyphenyl)-α-methylethyl]-pyrrolidine hydrochloride having a melting point of 152 to 153 degrees centigrade is obtained in substantially pure and crystalline form.

*Analysis.*—Percent calculated for $C_{14}H_{22}ClNO$: C, 65.73; H, 8.67; N, 5.48. Found: C, 65.85; H, 8.67; N, 5.49.

By heating a solution of N-[β-(ortho-methoxyphenyl)-α-methylethyl]-pyrrolidine with methyl iodide in benzene and cooling and concentrating the solution, the corresponding N-[β-(ortho - methoxyphenyl -α-methylethyl]-pyrrolidine methiodide is obtained.

Similarly, by reacting N-[β-(ortho-methoxyphenyl)-α-methylethyl]-pyrrolidine with selected esters such as, for example, ethyl chloride, benzyl chloride, and the like, the corresponding quaternary ammonium salts of N-[β-(ortho-methoxyphenyl)-α-methylethyl]-pyrrolidine are obtained such as, for example, N- β-(ortho-methoxyphenyl)-α-methylethyl]-pyrrolidine ethochloride, N-[β-(ortho-methoxyphenyl) - α - methylethyl]-pyrrolidine benzyl chloride, and the like.

*Example 3.—N[β-(ortho-methoxyphenyl)-α-methylethyl]-2-methylpyrrolidine hydrochloride*

Forty-one grams (0.25 mole) of ortho-methoxyphenylacetone and 21.28 grams (0.25 mole) of 2-methylpyrrolidine (Rec. Trav. Chim., 49, 242, 1930), were dissolved in 175 milliliters of methanol. The resulting solution was placed in a Parr hydrogenation apparatus together with 0.25 gram of platinum oxide catalyst and subjected to hydrogenation at a temperature of about 25 degrees centigrade and a hydrogen pressure of about fifty pounds per square inch until about one mole of hydrogen per mole of starting ortho-methoxyphenylacetone was taken up, i. e., about seventeen hours. The platinum hydrogenation catalyst was separated from the reaction mixture by filtration and the solvent removed by distillation at sub-atmospheric pressure. The oily residue thus-obtained was dissolved in ether and mixed with 200 milliliters of a dilute aqueous hydrochloric acid solution. The water layer was made alkaline with ammonium hydroxide and extracted with ether. The ether extract was dried over magnesium sulfate for twelve hours and the ether then removed by distillation. The oily material thus-obtained was distilled, two fractions of the purified N-[β-(ortho-methoxyphenyl)-α-methylethyl] - 2 - methylpyrrolidine being collected, one fraction having a boiling point between 150 to 159 degrees centigrade at a pressure of twelve millimeters of mercury and an index of refraction, 1.5221 $N_D^{20}$, and the second fraction having a boiling point of 159 degrees centigrade at a pressure of twelve millimeters of mercury and an index of refraction, 1.5223 $N_D^{20}$. To the two fractions of the substantially pure N-[β-(ortho-methoxyphenyl)-α-methylethyl] - 2 - methylpyrrolidine in a cooled ether solution was added ten mil- liliters of an ethanolic solution of hydrogen chloride. The resulting solution was filtered and the N-[β-(ortho-methoxyphenyl)-α-methylethyl]-2-methylpyrrolidine hydrochloride thus-obtained was recrystallized from acetone to obtain substantialy pure N-[β-(ortho-methyloxyphenyl)-α-methylethyl]-2-methylpyrrolidine hydrochloride melting between 155.75 to 156.5 degrees centigrade.

*Analysis.*—Percent calculated for $C_{15}H_{24}ClNO$: C, 66.77; H, 9.07; N, 5.19; Cl, 13.14. Found: C, 66.84; H, 9.12; N, 5.16; Cl, 13.16.

*Example 4.—N-[β-(ortho-methoxyphenyl)-α-methylethyl]-2-phenylpyrrolidine hydrochloride*

To fifty milliliters of absolute methanol was added 8.2 grams (0.05 mole) of ortho-methoxyphenylacetone and 7.25 grams (0.05 mole) of 2-phenylpyrrolidine (J. A. C. S., 53, 1833, 1931), and the resulting solution, together with 0.25 gram of platinum oxide catalyst, subjected to hydrogenation in a Parr hydrogenation apparatus at a temperature of about 25 degrees centigrade and a hydrogen pressure of about fifty pounds per square inch until about one mole of hydrogen per mole of starting ortho-methoxyphenylacetone was taken up, i. e., about two hours. On distillation of the reaction mixture, the solvent was removed and the resulting oily residue thus-obtained was distilled in vacuo thereby obtaining N-[β-(ortho-methoxyphenyl) - α - methylethyl]-2-phenylpyrrolidine having a boiling point of 180 to 185 degrees centigrade at a pressure of one millimeter of mercury and an index of refraction, $N_D^{20}=1.5611$. The oily material thus-obtained was dissolved in fifty milliliters of dry ether and five milliliters of an ethanolic solution of hydrogen chloride was added thereto. The mixture was chilled. After further cooling with scratching, a slightly gummy solid was obtained. The crude N-[β-(ortho-methoxyphenyl)-α-methylethyl] - 2 - phenylpyrrolidine hydrochloride thus-obtained was purified by dissolving in 1.7 parts of boiling isopropanol, decolorized with charcoal followed by the addition of 1.7 parts of acetone and six parts of ether to the clarified material. Crystallization of the desired N-[β-(ortho-methoxyphenyl)-α-methylethyl] - 2 - phenylpyrrolidine hydrochloride was induced by scratching the sides of the vessel containing the material with a glass rod. The white crystalline material thus-obtained had a melting point of 171 to 184 degrees centigrade. By adding a further amount of ether to the filtrate followed by chilling, a second crop of white crystalline N-[β-(ortho-methoxyphenyl)-α-methylethyl]-2-phenylpyrrolidine hydrochloride having a melting point of 180 to 185 degrees centigrade was obtained. On further recrystallization of the two crops of crystalline material, a mixture of substantially pure diastereoisomers of N-[β-(ortho-methoxyphenyl)-α-methylethyl]-2-phenylpyrrolidine hydrochloride melting at 194 to 200 degrees centigrade was obtained.

*Analysis.*—Percent calculated for $C_{20}H_{26}ClNO$: C, 72.37; H, 7.90; Cl, 10.68; N, 4.22. Found: C, 72.57; H, 7.91; Cl, 10.76; N, 4.22.

*Example 5.—N-[β-(para-ethoxyphenyl)-α-methylethyl]-pyrrolidine hydrochloride*

Following the procedure set forth in Example 1 supra, except for the substitution of para-methoxyphenylacetone by para-ethoxyphenylacetone, N-[β-(para-ethoxyphenyl)-α-methylethyl]-pyrrolidine is obtained. On treating the thus-obtained N-[β-(para-ethoxyphenyl - α - methylethyl]-pyrrolidine with an ethanolic solution of hydrogen chloride as indicated in Example 1 supra, the corresponding N-[β-(para-ethoxyphenyl)-α-methylethyl]-pyrrolidine hydrochloride is obtained.

*Example 6.—N-[β-(para-methoxyphenyl)-α-ethylethyl]-pyrrolidine hydrochloride*

Using the procedure set forth in Example 1 supra except for the substitution of para-methoxyphenylacetone by 1-(para-methoxyphenyl)-2-butanone, the corresponding N-[β-(para-methoxyphenyl)-α-ethylethyl]-pyrrolidine is obtained. On treating the thus-obtained N-[β-(para-methoxyphenyl-α-ethylethyl]-pyrrolidine with an ethanolic solution of hydrogen chloride in the manner set forth in Example 1 supra, the corresponding N-[β-(para-methoxyphenyl)-α-ethylethyl]-pyrrolidine hydrochloride is obtained.

Following the procedure set forth in the examples above, other N-[β-alkoxyphenyl - (α-alkyl) - ethyl] - pyrrolidines can be prepared such as, for example, N-[β-(meta-methoxyphenyl) - α - methylethyl]-pyrrolidine, N-[β-(ortho-ethoxyphenyl)-α-methylethyl]-pyrrolidine, N-[β-(meta-ethoxyphenyl)-α - methylethyl] - pyrrolidine, N-[β-(para-propoxyphenyl)-α-methylethyl]-pyrrolidine, N - [β-ortho-propoxyphenyl)-α-methylethyl] - pyrrolidine, N-[β-(meta-propoxyphenyl)-α-methylethyl]-pyrrolidine, N-[β-(para-butoxypyhenyl)-α-methylethyl]-pyrrolidine, N-[β-(ortho-butoxyphenyl)-α-methylethyl] - pyrrolidine, N - [β-(para-amyloxyphenyl)-α-methylethyl]-pyrrolidine, N-[β-(ortho-hexyloxyphenyl)-α-methylethyl]-pyrrolidine, N-[β-(para-heptyloxyphenyl) - α - methylethyl]-pyrrolidine, N-[β-(ortho-hexyloxyphenyl)-α-methylethyl]-pyrrolidine, N-[β-(para-heptyloxyphenyl)-α-methylethyl]-pyrrolidine, N-[β-(ortho-heptyloxphenyl)-α-methylethyl]-pyrrolidine, N-[β-(para-octyloxyphenyl)-α-methylethyl]-pyrrolidine, N-[β-(ortho-octyloxyphenyl)-α-methylethyl]-pyrrolidine, N-[β-(para-methoxylphenyl)-α - methylethyl] - 2 - ethylpyrrolidine, N-[β-(para-methoxyphenyl)-α-methylethyl]-2,3-diethylpyrrolidine, N-[β-(para-methoxyphenyl)-α-methylethyl]-2,3-dimethylpyrrolidine, N-[β-para-ethoxyphenyl)-α-methylethyl]-2-methylpyrrolidine, N-[β-(ortho-ethoxyphenyl)-α-methylethyl]-2-methylpyrrolidine, N-[β-(para-ethoxyphenyl)-α-propylethyl]-pyrrolidine, N-[β-(orotho-ethoxyphenyl)-α-propylethyl] - pyrrolidine, N-[β-(para-methoxyphenyl)-α-butylethyl]-pyrrolidine, N-[β-(ortho-methoxyphenyl)-α-butylethyl]-pyrrolidine, N-[β-(para-methoxyphenyl)-α-pentylethyl]-pyrrolidine, N-[β-(ortho-methoxyphenyl)-α-pentylethyl]-pyrrolidine, N-[β-(para-methoxyphenyl)-α-hexylethyl]-pyrrolidine, N-[β-(ortho-methoxyphenyl)-α-hexylethyl]-pyrrolidine, N-[β-(para-methoxyphenyl)-α-heptylethyl]-pyrrolidine, N-[β-(ortho-methoxyphenyl)-α-heptyethyl]-pyrrolidine, N-[β-(para-methoxyphenyl)-α-octylethyl]-pyrrolidine, N-[β-(ortho-methoxyphenyl)-α-octylethyl]-pyrrolidine, acid addition and quaternary ammonium salts of the foregoing free amine bases and the like.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. A compound selected from the group consisting of (*a*) pyrrolidines of the formula:

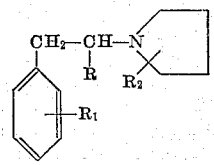

wherein R is a lower-alkyl group, $R_1$ is a lower-alkoxy group, and $R_2$ is a member selected from the group consisting of hydrogen, phenyl and mono- and di-lower-alkyl radicals, said lower-alkyl and said lower-alkoxy radicals containing from one to eight carbon atoms inclusive, and (*b*) non-toxic acid addition and quaternary ammonium salts selected from the group consisting of lower-alkyl and benzyl halides.

2. N-[β-(methoxyphenyl)-α-methylethyl] -pyrrolidines according to claim 1.

3. Non-toxic acid addition salts of N-[β-(methoxyphenyl)-α-methylethyl]-pyrrolidines according to claim 1.

4. N-[β-(para-methoxyphenyl)-α-methylethyl]-pyrrolidine.

5. Non-toxic acid addition salts of N-[β-(para-ethoxyphenyl)-α-methylethyl]-pyrrolidine.

6. N-[β-(para-methoxyphenyl)-α-methylethyl]-pyrrolidine hydrochloride.

7. N - [β - (ortho - methoxyphenyl) - α - methylethyl]-pyrrolidine.

8. Non - toxic acid addition salts of N - [β - (ortho-methoxyphenyl)-α-methylethyl]-pyrrolidine.

9. N - [β - (ortho - methoxyphenyl) - α - methylethyl]-pyrrolidine hydrochloride.

10. N - [β - (ortho - methoxyphenyl) - α - methylethyl] - 2 - methylpyrrolidine.

11. A process for the preparation of a pyrrolidine of the formula:

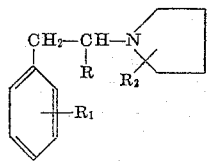

wherein R is a lower-alkyl group, $R_1$ is a lower-alkoxy group, and $R_2$ is a member selected from the group consisting of hydrogen, phenyl and mono- and di-lower-alkyl radicals, which comprises hydrogenating with hydrogen a mixture consisting of a ketone of the formula:

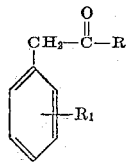

wherein R is a lower-alkyl group and $R_1$ is a lower-alkoxy group, and with an amine of the formula:

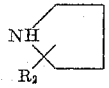

wherein $R_2$ is a member selected from the group consisting of hydrogen, phenyl and mono- and di-lower-alkyl groups, said lower-alkyl and lower-alkoxy containing from one to eight carbon atoms inclusive, under pressure and in the presence of a hydrogenation catalyst until one mole of hydrogen per mole of starting ketone has been adsorbed.

12. A process for the preparation of an N-[β-(methoxyphenyl)-α-methylethyl]-pyrrolidine which comprises hydrogenating with hydrogen a mixture of a methoxyphenylacetone and pyrrolidine under pressure and in the presence of a hydrogenation catalyst selected from the group consisting of palladium-charcoal, platinum and platinum oxide, until one mole of hydrogen per mole of methoxyphenylacetone has been adsorbed to form an N-[β-(methoxyphenyl)-α-methylethyl]-pyrrolidine.

13. A process for the preparation of N-[β-(ortho-methoxyphenyl)-α-methylethyl]-pyrrolidine which comprises hydrogenation with hydrogen a mixture of ortho-methoxyphenylacetone and pyrrolidine under pressure and in the presence of platinum oxide until one mole of hydrogen per mole of ortho-methoxy-phenylacetone has been adsorbed to form N-[β-(ortho-methoxyphenyl-α-methylethyl]-pyrrolidine.

14. A process for the preparation of a non-toxic acid addition salt of N-[β-(ortho-methoxyphenyl)-α-methylethyl]-pyrrolidine which comprises hydrogenating with hydrogen a mixture of ortho-methoxyphenylacetone and pyrrolidine under pressure and in the presence of platinum oxide until one mole of hydrogen per mole of ortho-methoxy-phenylacetone has been adsorbed to form N-[β-(ortho - methoxyphenyl) - α - methylethyl] - pyrrolidine and then treating said N-[β-(ortho-methoxyphenyl)-α-methylethyl]-pyrrolidine with an alcoholic solution of a mineral non-toxic acid to obtain the corresponding acid addition salt of N-[β-(ortho-methoxyphenyl)-α-methylethyl]-pyrrolidine.

15. A process for the preparation of N-[β-ortho-methoxyphenyl)-α-methylethyl]-pyrrolidine hydrochloride which comprises hydrogenating with hydrogen a mixture of ortho-methoxyphenylacetone and pyrrolidine under pressure and in the presence of platinum oxide until one mole of hydrogen per mole of ortho-methoxyphenylacetone has been adsorbed to form N-[β-(ortho-methoxyphenyl)-α-methylethyl]-pyrrolidine and then treating said N - [β - (ortho - methoxyphenyl) - α - methylethyl] - pyrrolidine with an alcoholic solution of hydrogen chloride to obtain N-[β-(ortho-methoxyphenyl)-α-methylethyl]-pyrrolidine hydrochloride.

16. A process for the preparation of N-[β-(para-methoxyphenyl)-α-methylethyl]-pyrrolidine which comprises hydrogenating with hydrogen a mixture of para-methoxyphenylacetone and pyrrolidine under pressure and in the presence of platinum oxide until one mole of hydrogen per mole of para-methoxyphenylacetone has been adsorbed to form N-[β-(para-methoxyphenyl)-α-methylethyl]-pyrrolidine.

17. A process for the preparation of a non-toxic acid addition salt of N-[β-(para-methoxyphenyl)-α-methylethyl]-pyrrolidine which comprises hydrogenating with hydrogen a mixture of para-methoxyphenylacetone and pyrrolidine under pressure and in the presence of platinum oxide until one mole of hydrogen per mole of para-methoxyphenylacetone has been adsorbed to form N-[β-(para - methoxyphenyl) - α - methylethyl] - pyrrolidine and then treating said N-[β-(para-methoxyphenyl)-α-methylethyl]-pyrrolidine with an alcoholic solution of a mineral non-toxic acid to obtain the corresponding acid addition salt of N-[β-(para-methoxyphenyl)-α-methylethyl]-pyrrolidine.

18. A process for the preparation of N-[β-(para-methoxyphenyl)-α-methylethyl]-pyrrolidine hydrochloride which comprises hydrogenating with hydrogen a mixture of para-methoxyphenylacetone and pyrrolidine under pressure and in the presence of platinum oxide until one mole of hydrogen per mole of para-methoxyphenylacetone has been adsorbed to form N-[β-(para-methoxyphenyl)-α-methylethyl]-pyrrolidine and then treating said N-[β-para-methoxyphenyl)-α-methylethyl]-pyrrolidine with an alcoholic solution of hydrogen chloride to obtain N-[β-(para - methoxyphenyl) - α - methylethyl] - pyrrolidine hydrochloride.

References Cited in the file of this patent

UNITED STATES PATENTS

| | | |
|---|---|---|
| 2,552,502 | Woodruff | May 8, 1951 |
| 2,662,886 | Ruddy et al. | Dec. 15, 1953 |
| 2,682,543 | Adamson et al. | June 29, 1954 |
| 2,683,742 | Cusic | July 13, 1954 |
| 2,686,808 | Sprague | Aug. 17, 1954 |

FOREIGN PATENTS

| | | |
|---|---|---|
| 884,569 | France | Aug. 20, 1949 |
| 805,521 | Germany | Mar. 15, 1951 |
| 624,118 | Great Britain | May 27, 1949 |
| 627,139 | Great Britain | July 29, 1949 |
| 682,160 | Great Britain | Nov. 5, 1952 |